Figure 1:
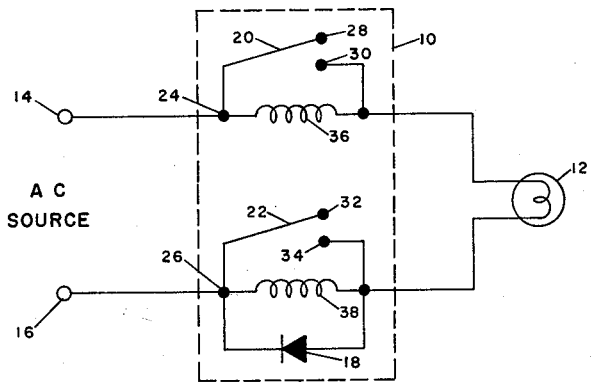

April 6, 1965     R. C. MORTON     3,177,399

MULTI-LEVEL LIGHT CONTROL

Original Filed Feb. 10, 1960

ROBERT C. MORTON
*INVENTOR.*

BY *Albert Rosen*
ATTORNEY

United States Patent Office 3,177,399
Patented Apr. 6, 1965

3,177,399
MULTI-LEVEL LIGHT CONTROL
Robert C. Morton, Inglewood, Calif., assignor to California Computer Products, Inc., Downey, Calif., a corporation of California
Original application Feb. 10, 1960, Ser. No. 7,926, now Patent No. 3,047,773, dated July 31, 1962. Divided and this application Feb. 26, 1962, Ser. No. 175,721
4 Claims. (Cl. 315—201)

This invention relates to an automaitc incandescent lamp switching arrangement useful in controlling light displays of the kind wherein periodic changes in illumination are used to attract attention, this application being a division of application No. 7,926, filed February 10, 1960, entitled "Automatic Light Control for Incandescent Lamps," now U.S. Patent No. 3,047,773.

Another object of this invention is the provision of an automatic and periodic incandescent lamp switching arrangement for displaying incandescent lamps in an attention gathering manner by effecting an illumination of the lamp at different illumination levels while switching the lamp between on and off conditions.

The foregoing and related objects are realized by connecting an incandescent lamp to an alternating current source through a switching arrangement according to the invention. The switching arrangement includes an automatic and periodic switching means for connecting the lamp directly to the alternating current source during one time interval, for providing a "full-tone" illumination of the lamp during this time interval, connecting a half-wave rectifier between the source and the lamp during a different time interval, for effecting a reduced or "half-tone" illumination of the lamp during the different time interval, and for completely interrupting the flow of current between the source and lamp during a further time interval. Since the arrangement of the invention provides three distinct and uniquely different kinds of changes in illumination level, namely a change in level between full-tone and half-tone lamp conditions, between off and full-tone conditions, and between off and half-tone conditions, an appreciably more striking light display arrangement is provided over that common to the more conventional on-off flashing displays where a single kind of illumination level change is effected.

Since the human eye is more readily attracted by a change in illumination level than by steady illumination, the switching arrangement of the invention provides a greater amount of change than is the case in the more conventional attention gathering switching arrangements where an incandescent lamp is switched between on and off positions only. Another advantage of the arrangement of the invention is that the use of a half-wave rectifier for providing the reduced illumination level is free from the generation of appreciable heat; thus the full-tone, half-tone arrangement finds use in residences, for example in providing an improved twinkling of Christmas tree lighting effects.

A discussion of half-wave rectifier incandescent lamp control, and the advantages of such control over the use of resistive, inductive, and capacitive arrangements, are provided in U.S. Patents 2,896,125 and 3,009,071.

Figure 2:
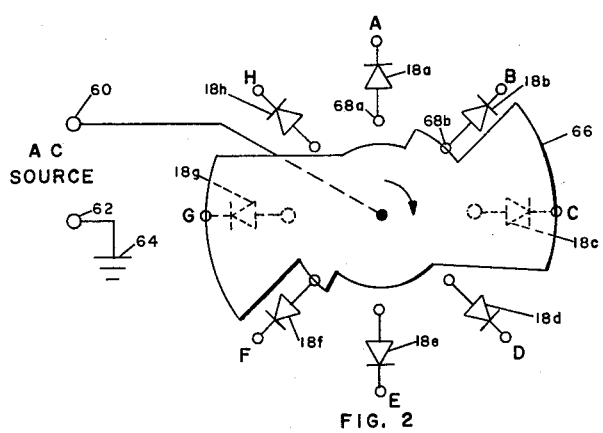
Figure 3:
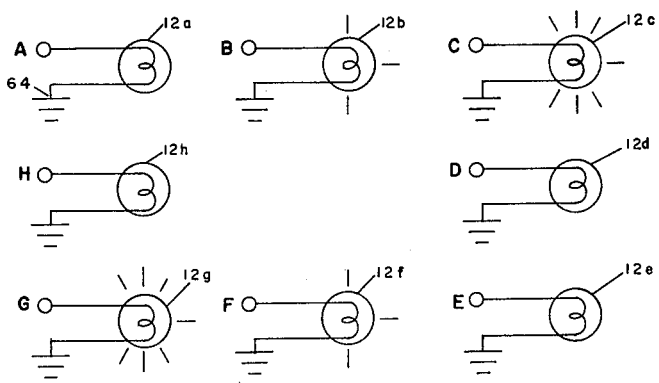

In the appended single sheet of drawing, wherein like reference characters refer to like parts;

FIGURE 1 is a schematic illustration of an incandescent lamp flashing arrangement periodically providing off, full-tone, and half-tone lamp flashing; and FIGURES 2 and 3 provide a schematic illustration of an automatic and periodic incandescent lamp display arrangement for controlling a plurality of lamps to provide a flashing light pattern.

As is known, the human eye is more readily attracted by a change in illumination level than by even a relatively bright but steady illumination. Thus, for example, advertising signs make extensive use of light flashing arrangements, where the alternate on and off conditions of lamps are relied upon to provide the attraction. Similarly, in residential Christmas tree displays, while different colored lamps are extensively used to provide an attractive display, extensive use is made of flashing arrangements for turning the lamps on and off so to provide an even more eye catching arrangement. According to the invention, the attraction of such displays is even further enhanced by not only changing the illumination of incandescent lamps between off and on conditions, but also by varying the illumination level during the on condition so as to provide an even greater variety of change in illumination conditions.

In explaining the operation of the invention, reference is made to the bi-metallic element light control arrangement illustrated in FIGURE 1. In the schematic view of FIGURE 1 the lamp control arrangement is outlined within the dashed lined portion 10. The incandescent lamp 12 to be controlled by the control arrangement 10 is connected through the lamp control arrangement 10, to a set of alternating current source terminals 14 and 16. The lamp control arrangement 10 operates to periodically connect the lamp 12 directly to the terminals 14 and 16 during one time interval, to substantially completely interrupt all current flow between the lamp 12 and the terminals 14 and 16 during a different time interval, and to connect a half-wave rectifier 18 in series with the lamp 12 during yet another time interval. Thus the lamp 12 displays at these different respective time intervals, a full-tone illumination level, an off condition, and a half-tone or dim illumination level. The difference in illumination level between the half-tone and full-tone illumination level is as striking to the human eye as the difference in illumination level between either the change from off to full-tone illumination or off to half-tone illumination. Consequently, this arrangement provides three different illumination intensity level changes as distinguished from the single intensity level change provided by the more conventional on-off flashing arrangement.

The lamp control arrangement 10 of FIGURE 1 includes two elongated bi-metallic elements 20 and 22. Each of the two elements 20 and 22 is fixed at one end thereof, at ends 24 and 26, respectively. Each of these bi-metallic elements 20 and 22 is movable, as a function of their temperature, to control the making or breaking of a pair of contacts 28 and 30, and 32 and 34, respectively. Each bi-metallic element 20 and 22 is serially connected between one of the alternating current source terminals 14 or 16 and the incandescent lamp 12. The half-wave rectifier 18 is connected to effectively electrically bridge the pair of contacts 32 and 34 of the second bi-metallic element 22.

Two relatively high resistance heating coils 36 and 38 are each positioned in heating adjacency to a respective bi-metallic element 20 and 22. Each of the heating coils 36 and 38 has an electrical resistance that is high compared to the expected lamp resistance, for example, the coils may each have a resistance of the order of 5,000 ohms. Each of the coils 36 and 38 are electrically connected to bridge the electrical circuit between the contacts 28 and 30, and 32 and 34, of its respective bi-metallic element.

In operation, the bi-metallic elements 20 and 22, are normally open, in the position depicted in FIGURE 1. At one given instant of time electric current flows into the lamp control arrangement 10 through one terminal 14, and through the first heating coil 36, then through the lamp 12, then through the diode 18 and the second heating coil 38 (a greater portion of the current flows through the diode 18 than the coil 38 since the diode has its conduction characteristics in this direction), and finally back to the alternating current source through the other terminal 16. Since the first heating coil 36 provides a relatively high electrical resistance, only a relatively small amount of current flows through lamp 12. Consequently, the lamp 12 is not effectively energized or illuminated. During a successive instant of time, current from the alternating current source flows in through the second terminal 16, through the second heating coil 38 (current cannot flow through the diode 18 in this reverse of conduction direction), through the lamp 12, through the first heating coil 36, and finally back to the source through the first terminal 14. In this case, too, so little current flows through the lamp 12, that it is not visably illuminated. Thus, it is seen that the first heating coil 36 will be continuously heated by current flow through the lamp control arrangement 10, while the second heating coil 38 will also be heated, but to a lesser extent than the first coil 36, since a small portion of the current by-passes this second coil 38 (through the diode 18) part of the time.

After a short while, the first bi-metallic element 20 is heated by the first heating coil 36 by an amount sufficient to effect a closing of the first set of contacts 28 and 30. Electric current now by-passes the first heating coil 36 since there is now no appreciable voltage drop across this coil. Current now flows through the first bi-metallic element 20, then through the lamp 12, and on every other half cycle flows through the half-wave rectifier 18, energizing it during that half cycle, and flows through the second coil 38 through the other half cycles of alternating current flow. Thus, during the closing of the first set of contacts 28 and 30, the lamp 12 is energized to glow at approximately half of its normal, full brilliance value.

Finally, the second heating coil 38 heats the second bi-metallic element 22 by an amount sufficient to effect a closing of the second set of contacts 32 and 34. When the second set of contacts closes, electric current by-passes both heating coils 36 and 38 and the half-wave rectifier 18, and energizes the electric lamp 12 to its full brilliance value. A short while later, one or the other of the two bi-metallic elements 20 or 22 cools (the particular bi-metallic element involved depends upon the thermal time constant of the element and the time of cessation of current flow to its associated heating coil). The cooling of the bi-metallic element breaks the circuit of its associated contacts. Thus, the first bi-metallic element 20 may break the circuit between its contacts 28 and 30. In such a case the lamp abruptly changes from full brilliancy or full tone illumination to an off condition since no appreciable current flows to the lamp 12 through the first heating coil 36. Alternatively, if instead of the first bi-metallic element 20 cooling first, the second bi-metallic element is the first to cool, the second set of contacts 32 and 34 are broken while the first set of contacts are still preserving the electrical circuit through them. In such a case the breaking of the second set of contacts allows the energization of the lamp 12 only during every other half cycle of alternating current flow. Consequently, the brilliancy of the lamp 12 abruptly changes from full tone to half tone. A short while later the second bi-metallic element 22 may open, in which case the lamp 12 suddenly changes its illumination condition from half tone to off, or the second bi-metallic element 22 may remain closed while the first bi-metallic element 20 may be heated sufficiently to again close its circuit between its set of contacts 28 and 30. In the latter case, the illumination level of the lamp 12 abruptly changes from half tone to full tone. From the foregoing it is seen that the illumination condition of lamp 12 is automatically changed to provide three different kinds of illumination level change, namely, between off and full tone illuminating conditions, between full tone and half tone illuminating conditions, and between half tone and off illuminating conditions. (Since each of the aforementioned three different kinds of illumination level change can occur in two different ways, for example from full tone to half tone or from half tone to full tone, six different changes in illumination level are provided.)

While the automatic flashing arrangement of the invention has been described with respect to different combinations of off, half-tone, and full-tone illumination, it is appreciated that the illumination level change flashing can be provided between half-tone and full-tone levels only. Such an arrangement is desirable in environments where it is desirable to have some light on all of the time. This may be provided by using the arrangement of FIGURE 1, but dispensing with the first coil 36 and with the first bi-metallic element 20 and the contacts 28 and 30, and directly connecting the first terminal 14 to the lamp 12.

In the arrangements of FIGURE 1 the illumination cycle of the lamp 12 is such that, on the average, the lamp is off for approximately 50% of the time, is illuminated at half-tone brilliancy for about 25% of the time, and is illuminated at full brilliancy for the remaining 25% of the time. If it is desired to increase the proportion of time that the lamp is illuminated, a second half-wave rectifier (not shown) may be connected in parallel with the first heating coil. This second rectifier is connected "back to back" with respect to the first rectifier 18 so that the first rectifier 18 is connected to oppose current flow during one half of each alternating current cycle and the other rectifier (not shown) is connected to oppose current flow during the other half cycle of alternating current flow. In such an arrangement no appreciable current flows to the lamp 12 when both bi-metallic elements 20 and 22 are open, but the lamp glows at half-tone illumination level when either of the two bi-metallic elements are closed and the other element is open, and glows at full-tone brilliancy when both bi-metallic elements are closed.

FIGURES 2 and 3 depict yet another light display control arrangement according to the invention. FIGURES 2 and 3 represent, respectively, a control arrangement and an arrangement of lamps to be controlled thereby. Referring first to FIGURE 3, there is illustrated a group of eight incandescent lamps 12a thru 12h, whose changes in illumination level are to be programmed or controlled to simulate a clockwise (with respect to the drawing) movement of markedly different lights. The display of FIGURE 3 is to be energized such that a simulation is given of a high brilliancy light traveling clockwise around the display followed by a low brilliancy light traveling the same path. Thus, at any given instant of time certain lamps, for example lamps 12a, 12d, 12e, and 12h will be dark, other lamps, 12c and 12g will glow at a full-tone illumination level, while other lamps 12b and 12f will glow at a markedly lesser or half-tone illumination level. At a succeeding instant of time the lamp conditions are to be moved to a succeeding clockwise position.

FIGURE 2 illustrates a control circuit for performing the aforementioned light control. Electric current from an alternating current source is fed to the arrangements through a pair of terminals 60 and 62. One terminal 62 is connected directly to ground 64, as is one side of each of the lamps 12a thru 12h (FIGURE 3) to be illuminated. The other terminal 60 is electrically connected to a rotor 66 which is connected to a motor (not shown) for movement in a clockwise direction with respect to the drawing. The rotor 66 has a configuration such that it makes electrical contact with the various terminals A through H and 68a, 68b, and so on; for providing a selection of the lamps 12a thru 12h (FIGURE 3) to be energized. The control arrangement of FIGURE 2A includes a number of half-wave rectifiers 18a thru 18h, one rectifier for each of the lamps 12a thru 12h. When the rotor 66 is positioned to make electrical contact with any of the outer terminals designated A through H in FIGURE 3, direct contact is made between the rotor 66 and the corresponding lamp terminal A through H of FIGURE 3. In this latter case, the lamp so energized is energized with full alternating current from the alternating current source. However, when the rotor 66 makes electrical contact with an inner terminal (68b, for example), and alternating current flow must pass through a rectifier 18b before reaching the outer terminal B, the corresponding lamp 12b is energized with pulsating direct current. Consequently, that lamp 12b now glows at a half-tone illumination level. Of course, when the rotor 66 is in a position such that no electrical contact is made with any of the terminals associated with an incandescent lamp, for example in the position shown in FIGURE 3 where no electrical connection is made with either terminal 66a or terminal A, the corresponding lamp (12a, in FIGURE 3) remains dark.

For convenience of explanation, a number of rectifiers 18a to 18h are illustrated as used for the lamps 12a to 12h, one rectifier per lamp. It will be appreciated that a single rectifier (not shown) may instead be used. In such a case the single rectifier would be mounted (for example on a separate rotor similar to rotor 66) so that all terminals that are to be energized at half power are energized by this separate rotor, full brilliancy energization being made by direct connection with the original rotor 66.

While the arrangements of FIGURES 2 and 3 disclose a perimeter type light display arrangement, it will be appreciated that any other light display pattern can be provided by the use of the arrangement of the invention. Thus, for example, a large number of incandescent lamps may be selectively energized at full or half-tone levels to provide an image (as by a punched tape program, with contacts to be energized being contacted by fingers through punched portions of the tape), with the image having half-tone portions corresponding to the lamps energized by a half-wave rectifier, and full-tone portions provided by the lamps that are directly energized by the alternating current. A change in the energization level of the various lamps can be continuously provided to provide a resultant display of a moving image.

What is claimed is:

1. Display arrangement of the kind having a plurality of incandescent lamps periodically and selectively energized to display a desired pattern, comprising: alternating current input circuit means; incandescent lamp output circuit means of the kind adapted to selectively energize desired ones of a plurality of incandescent lamps; a plurality of half-wave rectifiers; multi-position switching means connected to said circuit input means, to said circuit output means, and to said rectifiers to periodically energize each of said incandescent lamps directly with alternating current during one time interval and to said circuit input means through one of said rectifiers during a different time interval, whereby said arrangement is adapted to display a pattern of lamps whose illumination describes a desired display through energization at full-tone, half-tone, and zero illumination levels.

2. An incandescent lamp flashing arrangement, comprising: a single input circuit; a plurality of output circuits; periodic switching means of the kind operable to connect a desired one of said number of output circuits to said single input circuit; a half-wave rectifier; said switching means connected to provide a direct connection between said input circuit and one of said output circuits during one time interval, to connect said rectifier in a series electrical connection with said input circuit to provide a different one of said output circuits with a lower energization level during a different time interval, and to completely break the electrical continuity between said input circuit and all of said output circuits during a still different time interval.

3. An incandescent lamp flashing arrangement, comprising: a single input circuit; a plurality of output circuits; periodic switching means of the kind operable to connect a desired one of said number of output circuits to said single input circuit; a half-wave rectifier; said switching means connected to provide a direct connection between said input circuit and said one of said output circuits during one time interval, to connect said rectifier in a series electrical connection with said input circuit to provide said one output circuit with a lower energization level during a different time interval, and to completely break the electrical continuity between said input circuit and said one output circuit during a still different time interval.

4. The arrangement claimed in claim 3, wherein said switching means includes a motor driven rotor switching element.

References Cited by the Examiner
UNITED STATES PATENTS

| | | | |
|---|---|---|---|
| 2,177,488 | 10/39 | Hunter. | |
| 2,538,803 | 1/51 | Seaman | 315—211 X |
| 2,896,125 | 7/59 | Morton | 315—200.1 |
| 3,062,986 | 11/62 | Fritz et al. | 315—200.1 |

DAVID J. GALVIN, *Primary Examiner.*

JAMES D. KALLAM, *Examiner.*